United States Patent [19]

Kayanuma et al.

[11] Patent Number: 5,165,230

[45] Date of Patent: Nov. 24, 1992

[54] APPARATUS FOR DETERMINING DETERIORATION OF THREE-WAY CATALYST OF INTERNAL COMBUSTION ENGINE

[75] Inventors: Nobuaki Kayanuma, Gotenba; Masayuki Sawano, Sunto, both of Japan

[73] Assignee: Toyota Jidosha Kabushiki Kaisha, Aichi, Japan

[21] Appl. No.: 793,103

[22] Filed: Nov. 15, 1991

[30] Foreign Application Priority Data

Nov. 20, 1990 [JP] Japan ................................ 2-312794

[51] Int. Cl.⁵ ................................................ F01N 3/20
[52] U.S. Cl. ........................................ 60/276; 60/277; 60/285; 73/118.1
[58] Field of Search ........................ 60/276, 277, 285; 73/118.1

[56] References Cited

U.S. PATENT DOCUMENTS

| | | | |
|---|---|---|---|
| 3,969,932 | 7/1976 | Rieger | 60/276 |
| 4,251,989 | 2/1981 | Norimatsu | 60/276 |
| 4,622,809 | 11/1986 | Abthoff | 60/276 |
| 4,739,614 | 4/1988 | Katsuno et al. | |
| 5,077,970 | 1/1992 | Hamburg | 60/276 |
| 5,088,281 | 2/1992 | Izutani | 60/277 |
| 5,097,700 | 3/1992 | Nakane | 73/118.1 |

FOREIGN PATENT DOCUMENTS

| | | |
|---|---|---|
| 60-231155 | 11/1985 | Japan . |
| 61-185634 | 8/1986 | Japan . |
| 63-97852 | 4/1988 | Japan . |
| 2-30915 | 2/1990 | Japan . |
| 2-33408 | 2/1990 | Japan . |
| 2-91440 | 3/1990 | Japan . |
| 2-207159 | 8/1990 | Japan . |

Primary Examiner—Douglas Hart
Attorney, Agent, or Firm—Oliff & Berridge

[57] ABSTRACT

An apparatus for determining a deterioration of a condition of a three-way catalyst arranged in an exhaust passage of an internal combustion engine, comprising an upstream $O_2$ sensor arranged in the exhaust passage upstream of the catalyst and a downstream $O_2$ sensor arranged in the exhaust passage downstream of the catalyst. An air-fuel ratio feedback correction amount is calculated in accordance with the output of the upstream $O_2$ sensor, and the rate of change of the air-fuel ratio feedback correction amount is decreased when it is determined that the condition of the catalyst has deteriorated.

32 Claims, 13 Drawing Sheets

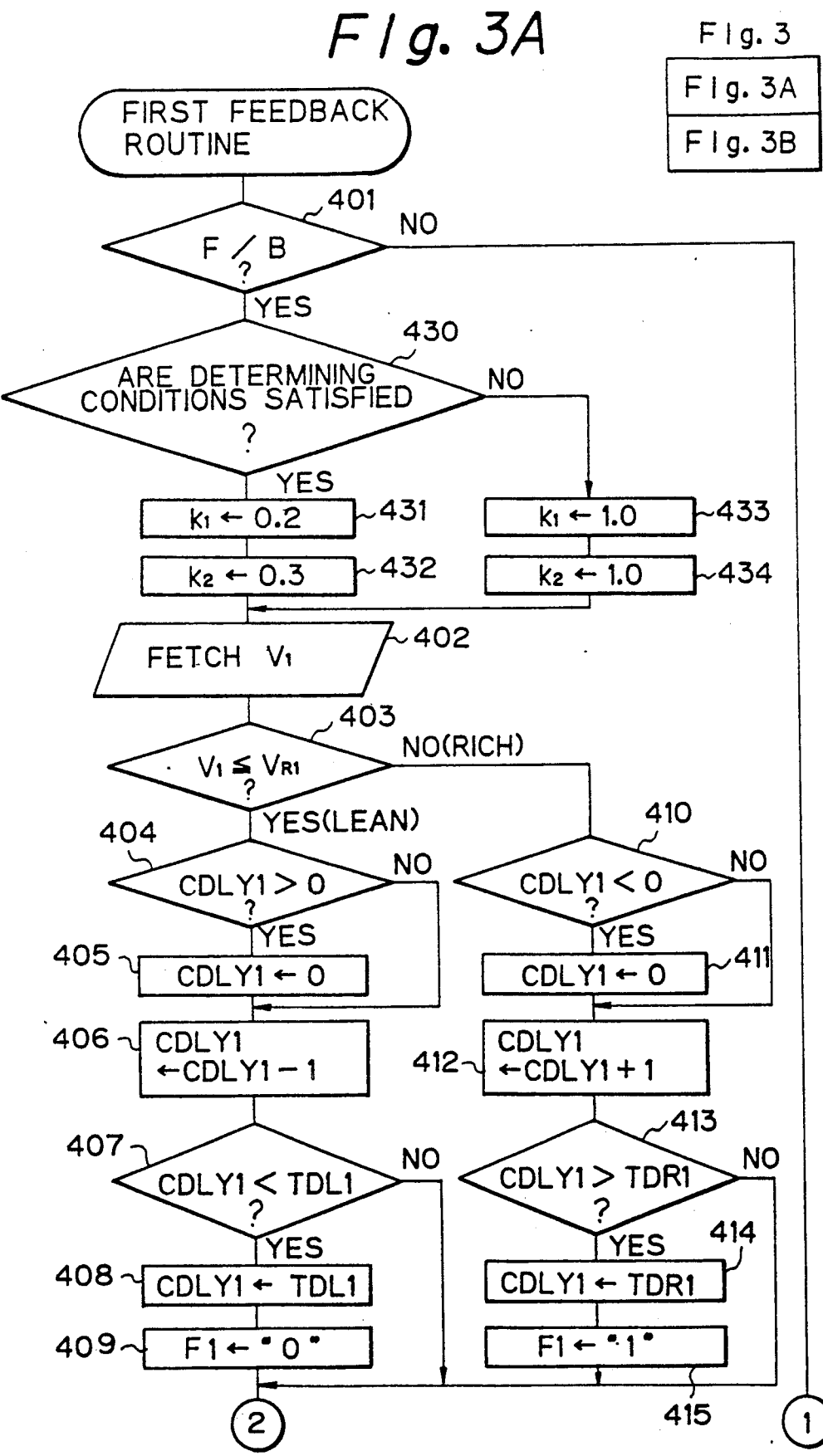

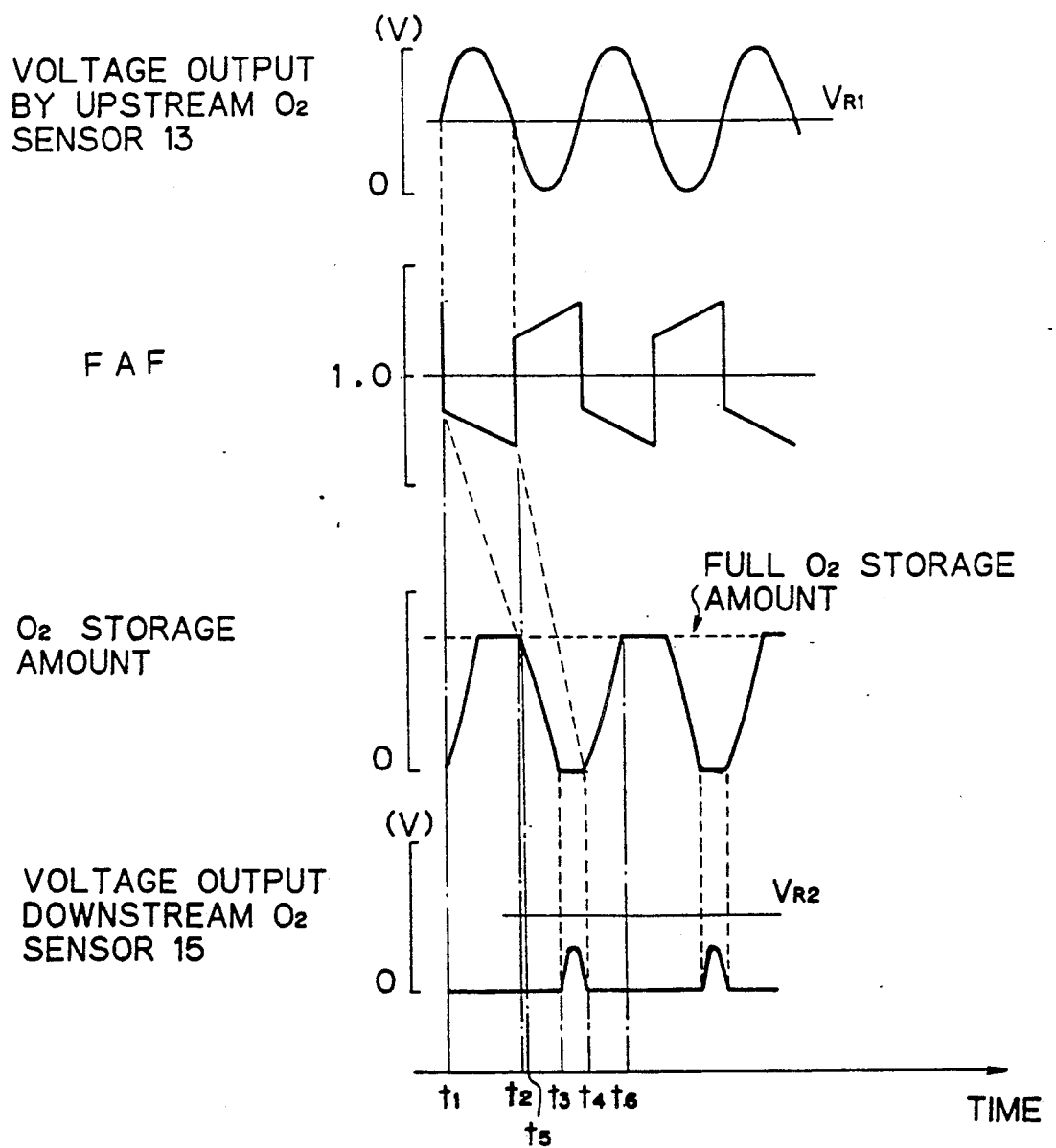

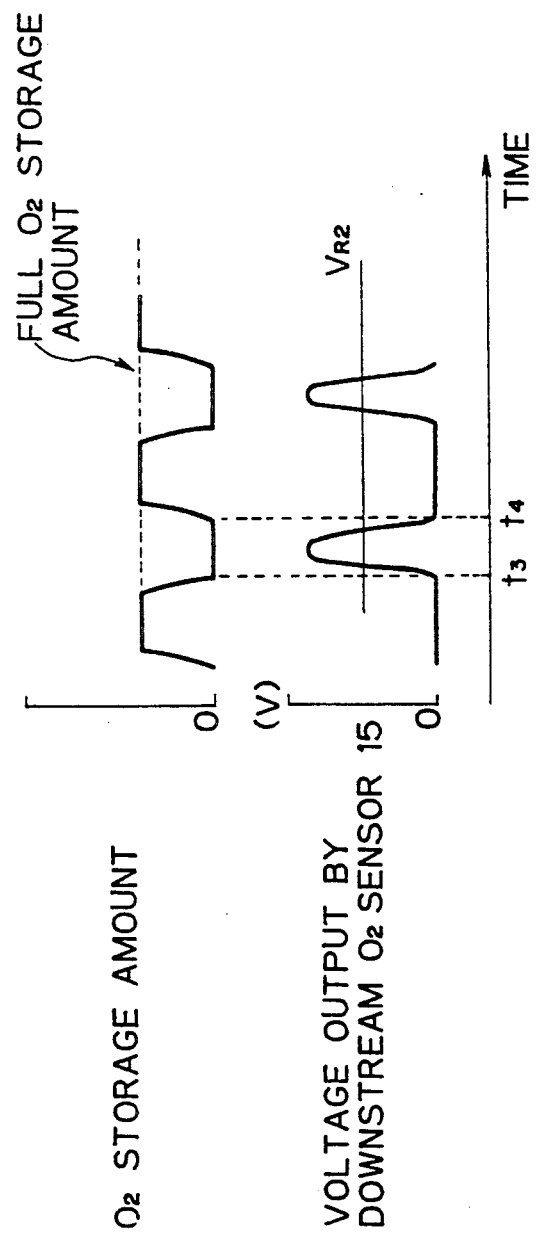

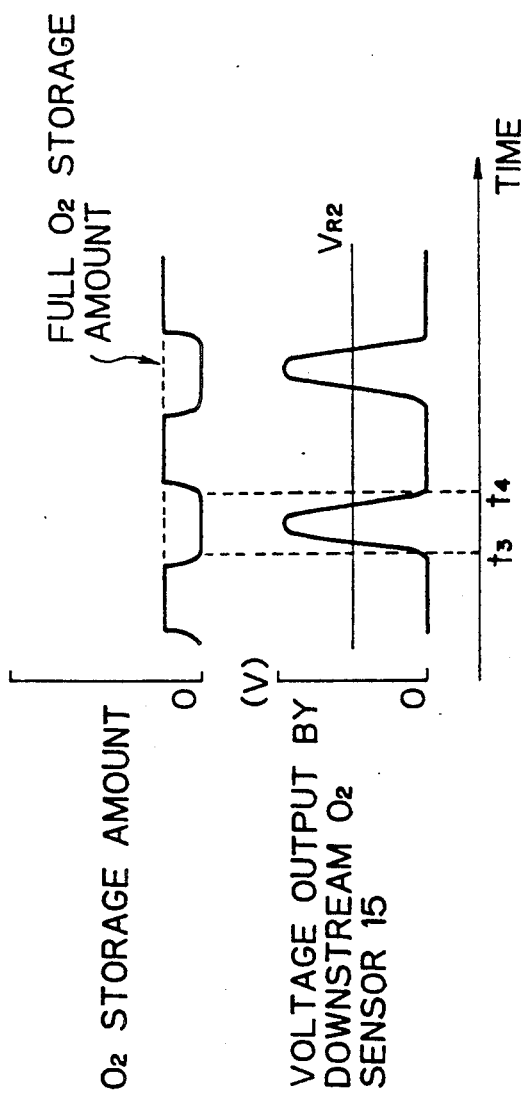

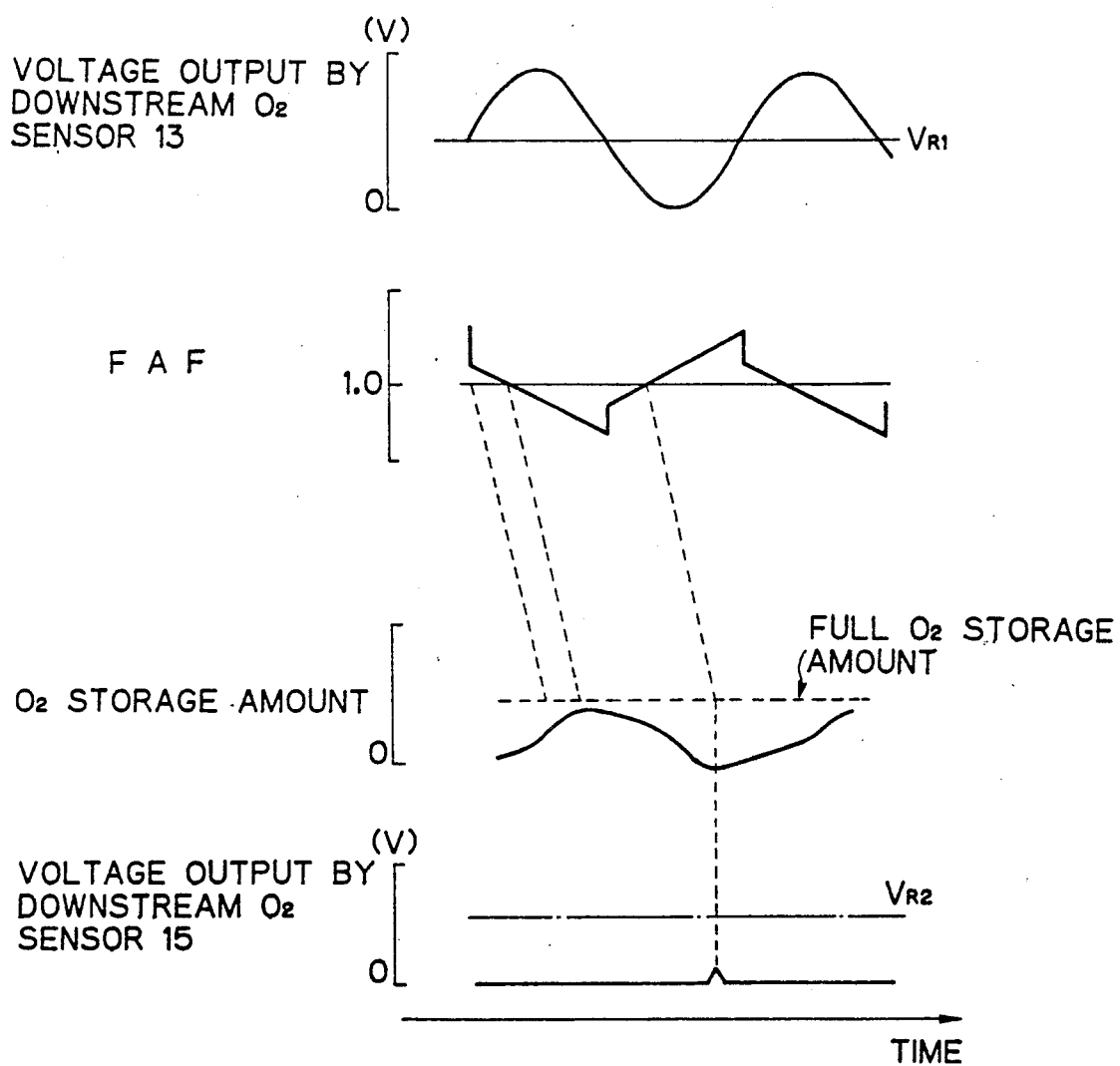

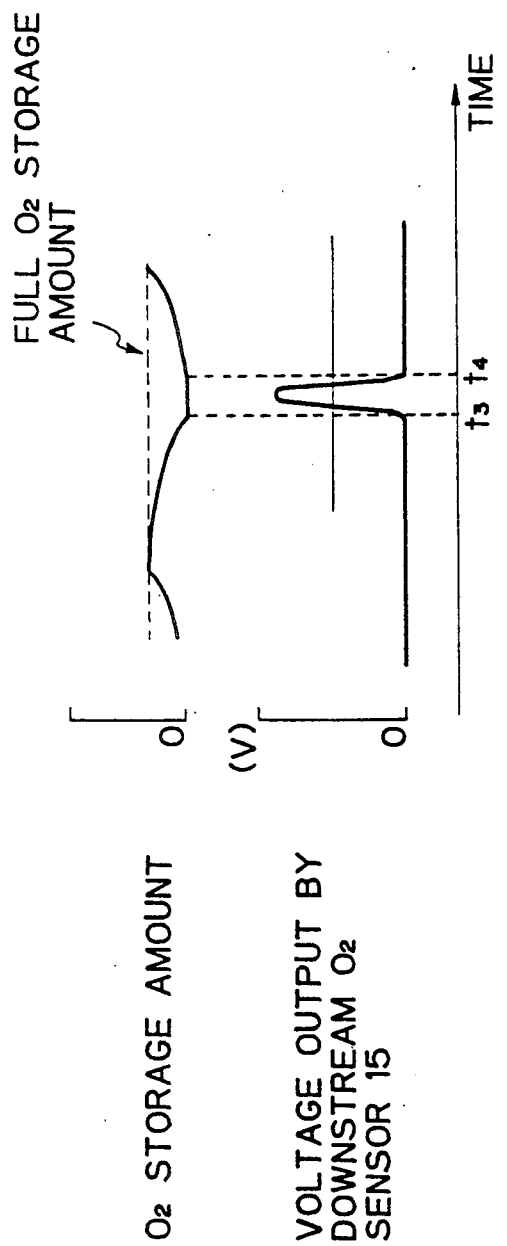

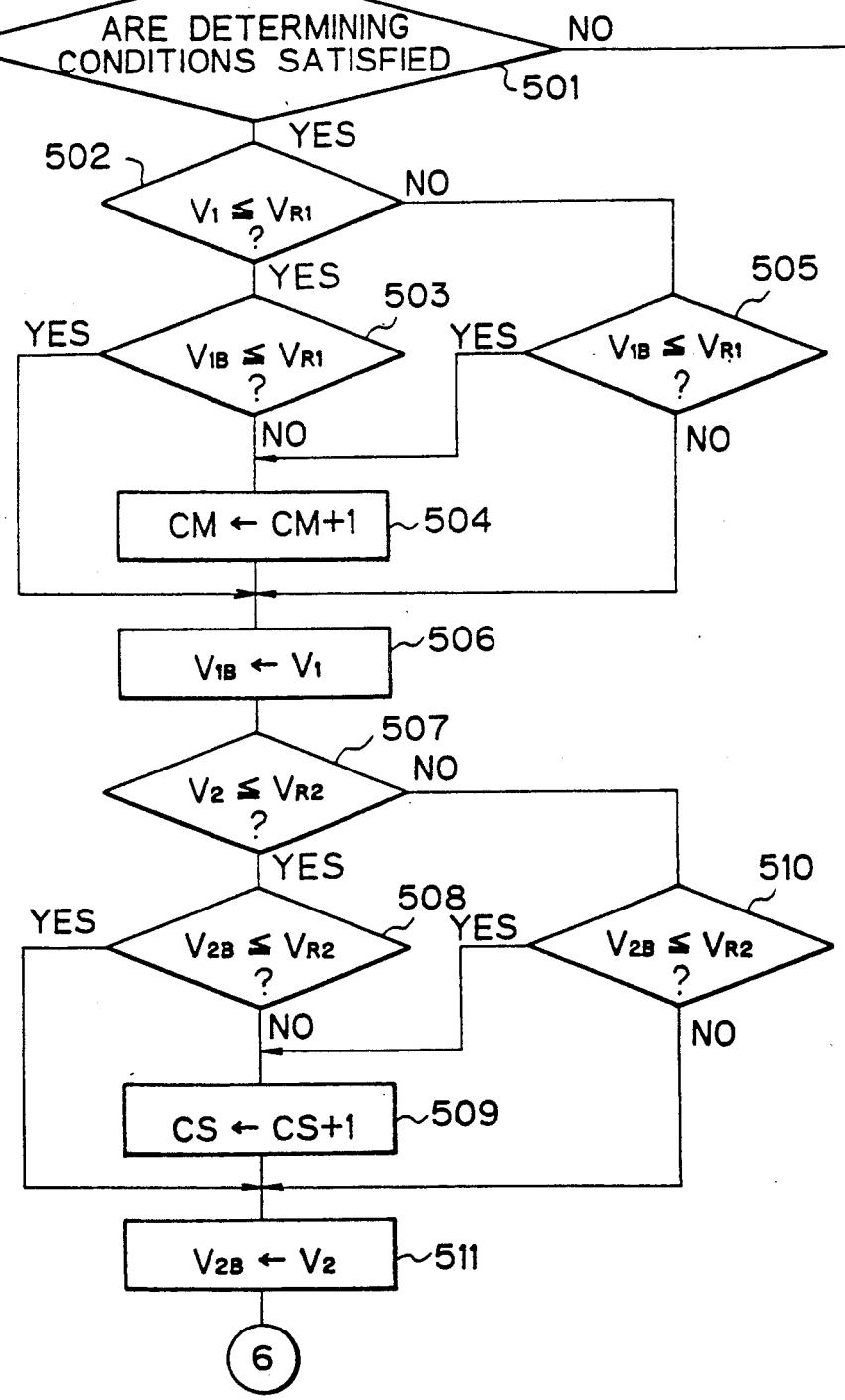

APPARATUS FOR DETERMINING DETERIORATION OF THREE-WAY CATALYST OF INTERNAL COMBUSTION ENGINE

BACKGROUND OF THE INVENTION

1. Field of the Invention

The present invention relates to an apparatus for determining a deterioration of a three-way catalyst arranged in an exhaust passage of an internal combustion engine.

2. Description of the Related Art

Japanese Unexamined Patent Publication No. 61-286550 discloses an apparatus for determining a deterioration of a three-way catalyst, wherein the three-way catalyst converter for purifying exhaust gas is arranged in an exhaust passage of an internal combustion engine, an upstream $O_2$ sensor is arranged in the exhaust passage upstream of the three-way catalyst converter, and a downstream $O_2$ sensor is arranged in the exhaust passage downstream of the three-way catalyst converter. The upstream and downstream $O_2$ sensors detect a concentration of oxygen in the composition of the exhaust gas. In this apparatus, it is determined that the condition of the catalyst has deteriorated when a ratio of a cycle of a reversion of an output of the upstream $O_2$ sensor to a cycle of a reversion of an output of the downstream $O_2$ sensor is larger than a predetermined value.

In this apparatus, however, a problem arises in that it cannot determine a considerable deterioration of the condition of the catalyst, i.e., whether or not the purification rate of HC has become smaller than 40-50%, for the following reasons.

In the usual air-fuel ratio feedback control, an air-fuel ratio feedback correction amount is calculated to obtain a proper control cycle of the air-fuel ratio, and the air-fuel ratio is controlled by the air-fuel ratio feedback correction amount. The rate of change of the air-fuel ratio feedback correction amount, i.e., the change of the air-fuel ratio feedback correction amount per unit time, is relatively large and thus the rate of change of the air-fuel ratio, i.e., the change of the air-fuel ratio per unit time, is also relatively large.

In this air-fuel ratio feedback control, since a full $O_2$ storage amount is reduced when the condition of the catalyst has deteriorated, the oxygen stored in the catalyst is consumed in a relatively short time. Accordingly, since the cycle of the reversion of the output of the downstream $O_2$ sensor is shorter than a predetermined time, it can be determined that the condition of the catalyst has deteriorated.

Nevertheless, since the rate of the change of the air-fuel ratio is relatively large, the oxygen stored in the catalyst is consumed in a short time when the condition of the catalyst has considerably deteriorated, i.e., when the purification rate of HC is smaller than 40-50%, similar to the state when the condition of the catalyst has slightly deteriorated, i.e., when the purification rate of HC is smaller than 80%. Therefore, the cycle of a reversion of the output of the downstream $O_2$ sensor when the condition of the catalyst has considerably deteriorated is substantially similar to the cycle of a reversion of the output of the downstream $O_2$ sensor when the condition of the catalyst has slightly deteriorated.

As a result, this apparatus cannot distinguish between a slight deterioration of the condition of the catalyst and a considerable deterioration of the condition of the catalyst.

SUMMARY OF THE INVENTION

An object of the present invention is to determine a considerable deterioration of the condition of a three-way catalyst.

According to the present invention, there is provided an apparatus for determining a deterioration of a condition of a three-way catalyst arranged in an exhaust passage of an internal combustion engine, the apparatus comprising: an upstream air-fuel ratio detecting means arranged in the exhaust passage upstream of the three-way catalyst, for detecting an air-fuel ratio; a downstream air-fuel ratio detecting means arranged in the exhaust passage downstream of the three-way catalyst, for detecting the air-fuel ratio; an air-fuel ratio feedback correction amount calculating means for calculating an air-fuel ratio feedback correction amount in accordance with an output of the upstream air-fuel ratio detecting means; an air-fuel ratio control means for controlling the air-fuel ratio to become a predetermined target air-fuel ratio on the basis of the air-fuel ratio feedback correction amount; an engine running state determining means for determining whether or not an engine running state is a predetermined engine running state in which it can be determined whether or not the condition of the three-way catalyst has deteriorated; a reducing means for reducing a rate of change of the air-fuel ratio feedback correction amount when the engine running state determining means determines that the engine running state is the predetermined engine running state; and a deterioration determining means for determining that the condition of the three-way catalyst has deteriorated when the number of reversions of an output of the downstream air-fuel ratio detecting means per unit time is larger than a predetermined number, when the engine running state determining means determines that the engine running state is the predetermined engine running state.

The present invention may be more fully understood from the description of preferred embodiment of the invention set forth below, together with the accompanying drawings.

BRIEF DESCRIPTION OF THE DRAWINGS

In the drawings:

FIGS. 5 through 7 are time charts for explaining a conventional determination of a deterioration of the condition of a catalyst;

FIGS. 8 and 9 are time charts for explaining a determination of a deterioration of the condition of a catalyst according to the present invention.

DESCRIPTION OF THE PREFERRED EMBODIMENTS

Figure 1:
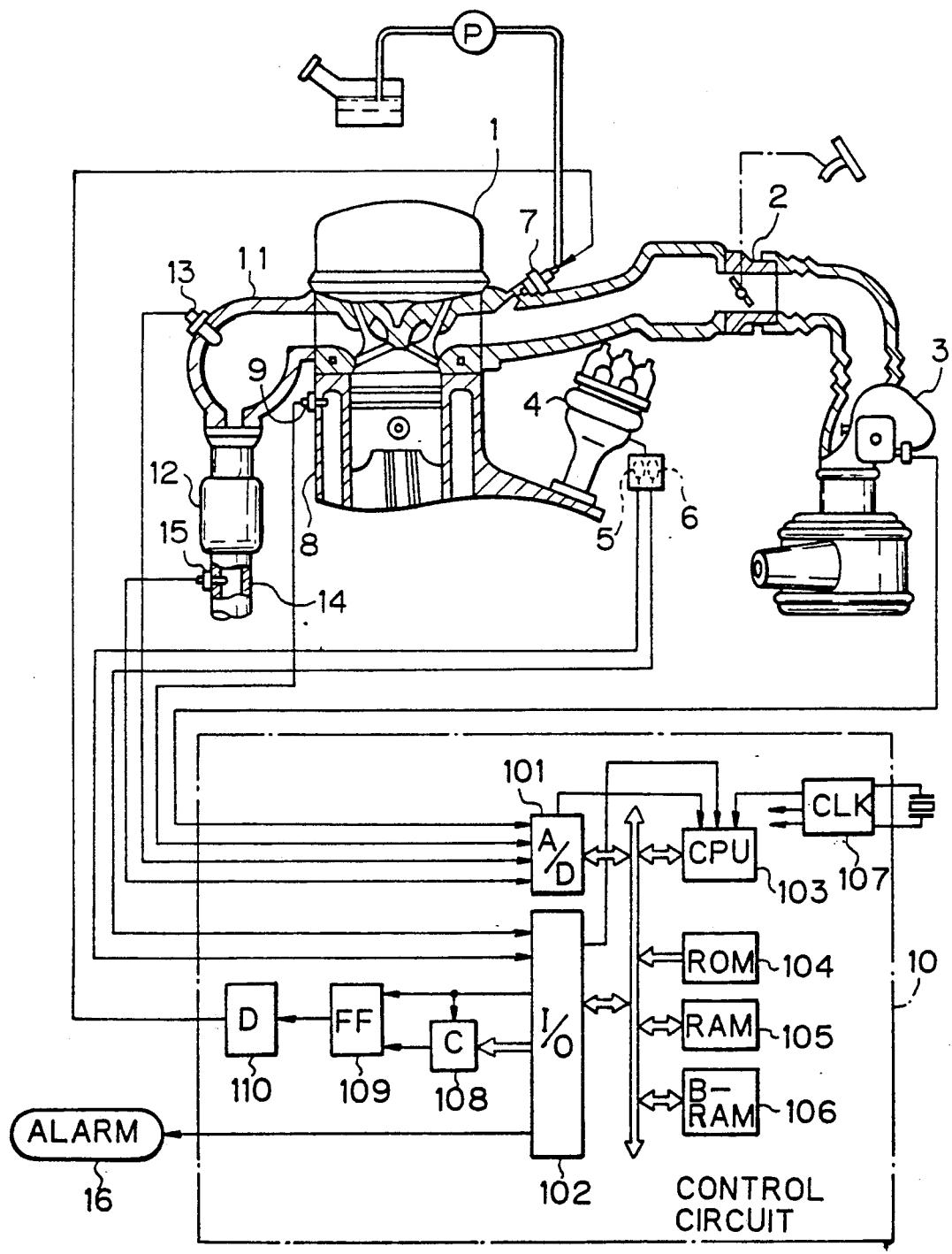
FIG. 1 is a schematic view of an internal combustion engine according to the present invention.

In FIG. 1, which illustrates an internal combustion engine according to the present invention, reference numeral 1 designates a four-cycle spark ignition engine disposed in an automotive vehicle. Provided in an air-intake passage 2 of the engine 1 is a potentiometer-type airflow meter 3 for detecting the amount of air drawn into the engine 1, to generate an analog voltage signal proportional to the amount of air flowing therethrough. The signal of the airflow meter 3 is transmitted to a multiplexer-incorporating analog-to-digital (A/D) converter 101 of a control circuit 10.

Disposed in a distributor 4 are crank angle sensors 5 and 6 for detecting the angle of the crankshaft (not shown) of the engine 1.

In this case, the crank angle sensor 5 generates a pulse signal at every 720° crank angle (CA) and the crank angle sensor 6 generates a pulse signal at every 30° CA. The pulse signals of the crank angle sensors 5 and 6 are supplied to an input/output (I/0) interface 102 of the control circuit 10. Further, the pulse signal of the crank angle sensor 6 is supplied to an interruption terminal of a central processing unit (CPU) 103.

Also provided in the air-intake passage 2 is a fuel injector 7 for supplying pressurized fuel from the fuel system to the air-intake port of the cylinder of the engine 1. Note, other fuel injectors are also provided for other cylinders but are not shown in FIG. 1.

Disposed in a cylinder block 8 of the engine 1 is a coolant temperature sensor 9 for detecting the temperature of the coolant. The coolant temperature sensor 9 generates an analog voltage signal in response to the temperature THW of the coolant, and transmits that signal to the A/D converter 101 of the control unit 10.

Provided in an exhaust system on the downstream side of an exhaust manifold 11 is a three-way reducing and oxidizing catalyst converter 12, for simultaneously removing three pollutants, CO, HC, and $NO_x$, from the exhaust gas.

Provided on the concentration portion of the exhaust manifold 11, i.e., upstream of the catalyst converter 12, is an upstream $O_2$ sensor 13, for detecting a concentration of oxygen in the exhaust gas. Further, provided in an exhaust pipe 14 downstream of the catalyst converter 12 is a downstream $O_2$ sensor 15, for detecting a concentration of oxygen in the exhaust gas. The $O_2$ sensors 13 and 15 generate output voltage signals and transmit those signals to the A/D converter 101 of the control unit.

Reference numeral 16 designates an alarm activated when the condition of the three-way catalyst converter 12 has deteriorated.

The control circuit 10, which may be constructed by a microcomputer, further comprises a central processing unit (CPU) 103, a read-only memory (ROM) 104 for storing a main routine and interrupt routines such as a fuel injection routine, an ignition timing routine, tables (maps), constants, etc., a random access memory 105 (RAM) for storing temporary data, a backup RAM 106, a clock generator 107 for generating various clock signals, a down counter 108, a flip-flop 109, a driver circuit 110, and the like.

Note that a battery (not shown) is connected directly to the backup RAM 106, and therefore, the content of the RAM 106 is not erased even when the ignition switch (not shown) is turned OFF.

The down counter 108, the flip-flop 109, and the driver circuit 110 are used for controlling the fuel injection 7. Namely, when a fuel injection amount TAU is calculated in a TAU routine, as explained later, the amount TAU is preset in the down counter 108, and simultaneously, the flip-flop 109 is set, and as a result, the driver circuit 110 initiates the activation of the fuel injector 7. Further, the down counter 108 counts up clock signals, sent from the clock generator 107, and finally, generates a logic "1" signal from the borrow-out terminal of the down counter 108, to reset the flip-flop 109, whereby the driver circuit 110 stops the activation of the fuel injector 7, and thus an amount of fuel corresponding to the fuel injection amount TAU is injected from the fuel injector 7.

Interruptions occur at the CPU 103 when the A/D converter 101 completes an A/D conversion and generates an interrupt signal; when the crank angle sensor 6 generates a pulse signal; and when the clock generator 107 generates a special clock signal.

The intake air amount data Q of the airflow meter 3 and the coolant temperature data THW of the coolant temperature sensor are fetched by an A/D conversion routine(s) executed at predetermined intervals, and then stored in the RAM 105, i.e., the data Q and THW in the RAM 105 are renewed at predetermined intervals. The engine speed Ne is calculated by an interrupt routine executed at 30° CA, i.e., at every pulse signal of the crank angle sensor 6, and is then stored in the RAM 105.

Figure 2:
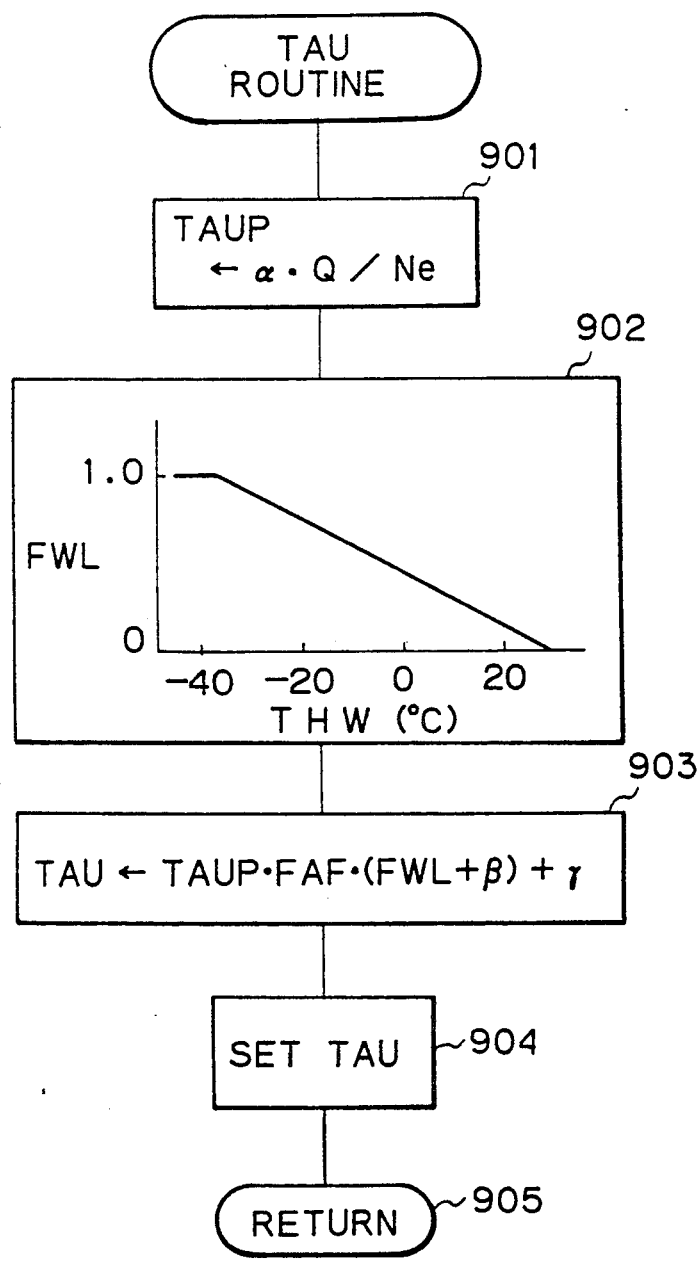
FIG. 2 is a flow chart for calculating a fuel injection amount TAU.

FIG. 2 is a routine for calculating a fuel injection amount TAU executed at every predetermined crank angle such as 360° CA. At step 901, a base fuel injection amount TAUP is calculated by using the intake air amount data Q and the engine speed data Ne stored in the RAM 105, i.e., $$TAUP = \alpha \cdot Q/Ne$$

where $\alpha$ is a constant.

At step 902, a warming-up incremental amount FWL is calculated from a one-dimensional map by using the coolant temperature data THW stored in RAM 105. Note that the warming-up incremental amount FWL decreases when the coolant temperature THW increases. At step 903, the fuel injection amount TAU is calculated by $$TAU = TAUP \cdot FAF \cdot (FWL + \beta) + \tau$$

where $\beta$ and $\tau$ are correction factors determined by other parameters such as the voltage of the battery and the temperature of intake air.

At step 904, the fuel injection amount TAU is set in the down counter 108, and further, the flip-flop 109 is set to initiate the activation of the fuel injector 7. This routine is then completed by step 905. Note that, as explained above, when a time corresponding to the fuel injection amount TAU has passed, the flip-flop 109 is reset by the carry-out signal of the down counter 108, to stop the activation of the fuel injector 7.

Figure 3B:
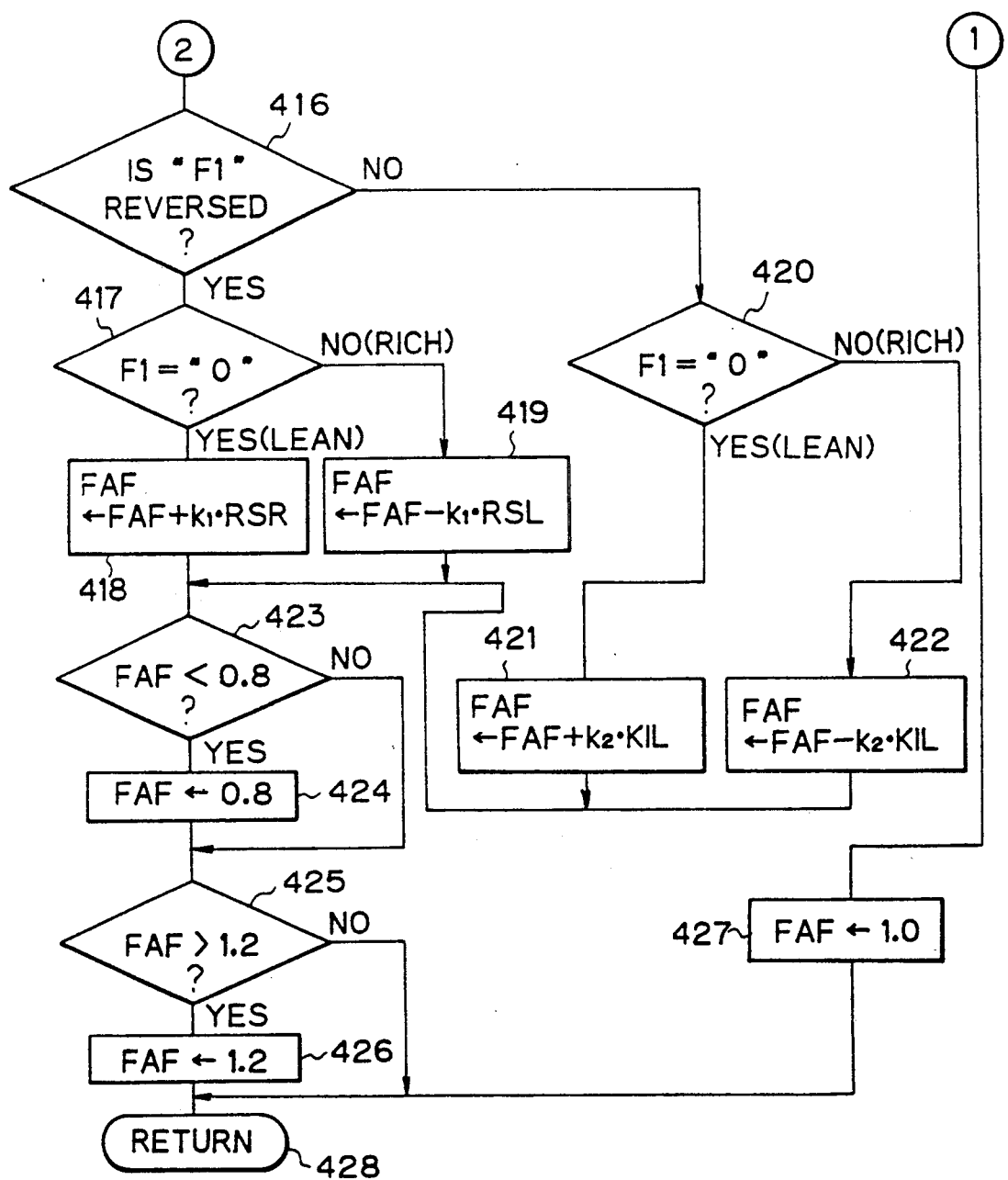
FIG. 3 (3A and 3B) is a flow chart for calculating an air-fuel ratio feedback correction amount FAF.

FIGS. 3A and 3B are a routine for calculating an air-fuel ratio feedback correction amount FAF in accordance with the output of the upstream $O_2$ sensor 13 executed at a predetermined time such as 4 ms.

At step 401, it is determined whether or not all of the feedback control (closed-loop control) conditions by the upstream $O_2$ sensor 13 are satisfied. The feedback control conditions are as follows.

i) the engine is not in a fuel cut-off state;
ii) the engine is not in a starting state;
iii) the coolant temperature THW is higher than 50° C.; and
iv) the upstream $O_2$ sensor 13 is in an activated state Note that the determination of activation/nonactivation of the upstream $O_2$ sensor 13 is carried out by determining whether or not the coolant temperature THW $\geq 70°$ C., or by whether or not the output voltage $V_1$ of the upstream $O_2$ sensor 13 is lower than a predetermined value. Note, other feedback control conditions are introduced as occasion demands, but an explanation of such other feedback control conditions is omitted.

If one or more of the feedback control conditions is not satisfied, the control proceeds to step 427, and the air-fuel ratio feedback correction amount is made 1.0.

Contrary to the above, at step 401, if all of the feedback control conditions are satisfied, the control proceeds to step 430. At step 430, it is determined whether or not an engine running state is an engine running state in which a determination of a deterioration of the condition of the catalyst of the catalyst converter 12 is possible, i.e., it is determined whether or not the determining conditions are satisfied. For example, when the engine speed Ne is between $N_1$ and $N_2$ and the intake air amount Q is between $Q_1$ and $Q_2$, it is determined that the determining conditions are satisfied. Namely, when a running state other than an idling running state, an acceleration running state, a deceleration running state, etc., exists, it is determined that the determining conditions are satisfied.

When the determining conditions are not satisfied, the routine goes to step 433 and a skip coefficient K1 is made 1.0, and then at step 434, an integration coefficient K2 is made 1.0, and accordingly, a normal correction amount FAF is calculated (see steps 418, 419, 421, and 422).

Conversely, at step 430, when it is determined that the determining conditions are satisfied, the routine goes to step 431 and the skip coefficient K1 is made 0.2, and then at step 432, the integration coefficient K2 is made to 0.3, and accordingly, the skip amount RSR, RSL and the integration amount KIR, KIL are reduced.

Note, the skip coefficient K1 and the integration coefficient K2 can be variables.

At step 402, an A/D conversion is performed upon the output voltage $V_1$ of the upstream $O_2$ sensor 13, and the A/D converted value thereof is then fetched from the A/D converter 101. Then, at step 403, the voltage $V_1$ is compared with a reference voltage $V_{R1}$ such as 0.45V, to thereby determine whether the current air-fuel ratio detected by the upstream $O_2$ sensor 13 is on the rich side or the lean side with respect to the stoichiometric air-fuel ratio.

If $V_1 \leq V_{R1}$, i.e., the current air-fuel ratio is lean, the control proceeds to step 404 and it is determined whether or not the value of a first delay counter CDLY1 is positive. If CDLY1>0, the control proceeds to step 405 and the first delay counter CDLY1 is cleared, and then proceeds to step 406. If CDLY1≦0, the control proceeds directly to step 406. At step 406, the first delay counter CDLY1 is counted down by 1, and at step 407, it is determined whether or not CDLY1<TDL1. Note that TDL1 is a first lean delay time for which a rich state is maintained even after the output of the upstream $O_2$ sensor 13 is changed from the rich side to the lean side, and is defined by a negative value. Therefore, at step 407, only when CDLY1<TDL1 does the control proceed to step 408, at which CDLY1 is made TDL1, and then to step 409 at which a first air-fuel ratio flag F1 is made "0" (lean state).

On the other hand, if $V_1 > V_{R1}$ at step 403, i.e., the current air-fuel ratio is rich, the control proceeds to step 410 and it is determined whether or not the value of the first delay counter CDLY1 is negative. If CDLY1>0, the control proceeds to step 411, and the first delay counter CDLY1 is cleared, and then proceeds to step 412. If CDLY1>0, the control proceeds directly to step 412. At step 412, the first delay counter CDLY1 is incremented by 1, and at step 413, it is determined whether or not CDLY1>TDR1. Note that TDR1 is a rich delay time for which a lean state is maintained even after the output of the upstream $O_2$ sensor 13 is changed from the lean side to the rich side, and is defined by a positive value. Note, TDR1 can be equal to TDL1. Therefore, at step 413, only when CDLY1>TDR1 does the control proceed to step 414, at which CDLY1 is made TDR1, and then to step 415, at which the first air-fuel ratio flag F1 is made "1" (rich state).

Next, at step 416, it is determined whether or not the first air-fuel ratio flag F1 is reversed, i.e., whether or not the delayed air-fuel ratio detected by the upstream $O_2$ sensor 13 is reversed. If the first air-fuel ratio flag F1 is reversed, the control proceeds to step 417 to 419, to thereby carry out a skip operation.

At step 417, if the flag F1 is "0" (lean), the control proceeds to step 418, and the correction amount FAF is remarkably increased by K1.RSR; where RSR is a skip amount. Also, if the flag F1 is "1" (rich) at step 417, the control proceeds to step 419, and the correction amount FAF is remarkably decreased by K1.RSL; where RSL is a skip amount.

Note, as mentioned above, when the determining conditions are not satisfied, the skip coefficient is made 1.0, and when the determining conditions are satisfied, the skip coefficient is made 0.2. Namely, when the determining conditions are satisfied, K1.RSR and K1.RSL are reduced as necessary. Further, if the first air-fuel ratio flag F1 is not reversed at step 416, the control proceeds to steps 420 to 422, at which an integration operation is carried out. Namely, if the flag F1 is "0" (lean) at step 420, the control proceeds to step 421 and the correction amount FAF is gradually increased by k2.KIR. Where KIR is a rich integration amount. Also, if the flag F1 is "1" (rich) at step 420, the control proceeds to step 422 and the correction amount FAF is gradually decreased by k2.KIL; where KIL is a lean integration amount.

Note, as mentioned above, when the determining conditions are not satisfied, the integration coefficient is made 1.0, and when the determining conditions are satisfied, the integration coefficient is made 0.3. Namely, when the determining conditions are satisfied, k2.KIR and k2.KIL are reduced as necessary; where the integration amount KIR and KIL are smaller than the skip amount RSR and RSL.

The correction amount FAF is guarded by a minimum value 0.8 at steps 423 and 424, and the correction amount FAF is guarded by a maximum value 1.2 at steps 425 and 426, and thus the controlled air-fuel ratio is prevented from becoming overlean or overrich.

The correction amount FAF is then stored in the RAM 105, to thus complete this routine of FIGS. 3A and 3B at step 428.

Air-fuel ratio feedback control operations by the downstream $O_2$ sensor 15 will be explained. As the air-fuel ratio feedback control parameters, there are used a delay time TD (in more detail, the rich delay time TDR1 and the lean delay time TDL1), a skip amount RS (in more detail, the rich skip amount RSL, and the lean skip amount RSL), an integration amount KI (in more detail, the rich integration amount KIR and the lean integration amount KIL), and the reference voltage $V_{R1}$.

For example, if the rich skip amount RSR is increased or if the lean skip amount RSL is decreased, the controlled air-fuel ratio becomes richer, and if the lean skip amount RSL is increased or if the rich skip amount RSR is decreased, the controlled air-fuel ratio becomes leaner, and thus the air-fuel ratio can be controlled by changing the rich skip amount RSR and the lean skip amount RSL in accordance with the output of the downstream $O_2$ sensors. Also, if the rich integration amount KIR is increased or if the lean integration amount KIL is decreased, the controlled air-fuel ratio becomes richer, and if the lean integration amount KIL is increased or if the rich integration amount KIR is decreased, the controlled air-fuel ratio becomes leaner, and thus the air-fuel ratio can be controlled by changing the rich integration amount KIR and the lean integration amount KIL in accordance with the output of the downstream $O_2$ sensor 15. Further, if the rich delay time TDR1 becomes longer or if the lean delay time TDL1 becomes shorter, the controlled air-fuel becomes rich, and if the lean delay time TDL1 becomes longer or if the rich delay time TDL1 becomes shorter, the controlled air-fuel ratio becomes leaner, and thus the air-fuel ratio can be controlled by changing the rich delay time TDR1 and the lean delay time (−TDL1) in accordance with the output of the downstream $O_2$ sensor 15. Still further, if the reference voltage $V_{R1}$ is increased, the controlled air-fuel ratio becomes richer, and if the reference volta $V_{R1}$ is decreased, the controlled air-fuel ratio becomes leaner, and thus the air-fuel ratio can be controlled by changing the reference voltage $V_{R1}$ in accordance with the output of the downstream $O_2$ sensor 15.

There are various advantages gained by the control of the air-fuel ratio feedback control parameters by the output $V_2$ of the downstream $O_2$ sensor 15. For example, when the delay times TDR1 are TDL1 and controlled by the output $V_2$ of the downstream $O_2$ sensor 15, it is possible to precisely control the air-fuel ratio. Also, when the skip amounts RSR and RSL are controlled by the output $V_2$ of the downstream $O_2$ sensor 15, it is possible to improve the response speed of the air-fuel ratio feedback control by the output $V_2$ of the downstream $O_2$ sensor 15. Note it is of course possible to simultaneously control two or more kinds of the air-fuel ratio feedback control parameters by the output $V_2$ of the downstream $O_2$ sensor 15.

A double $O_2$ sensor system into which the skip amount changed in accordance with the output of the downstream $O_2$ sensor 15 is introduced will be explained with reference to FIGS. 4A and 4B.

Figure 4A:
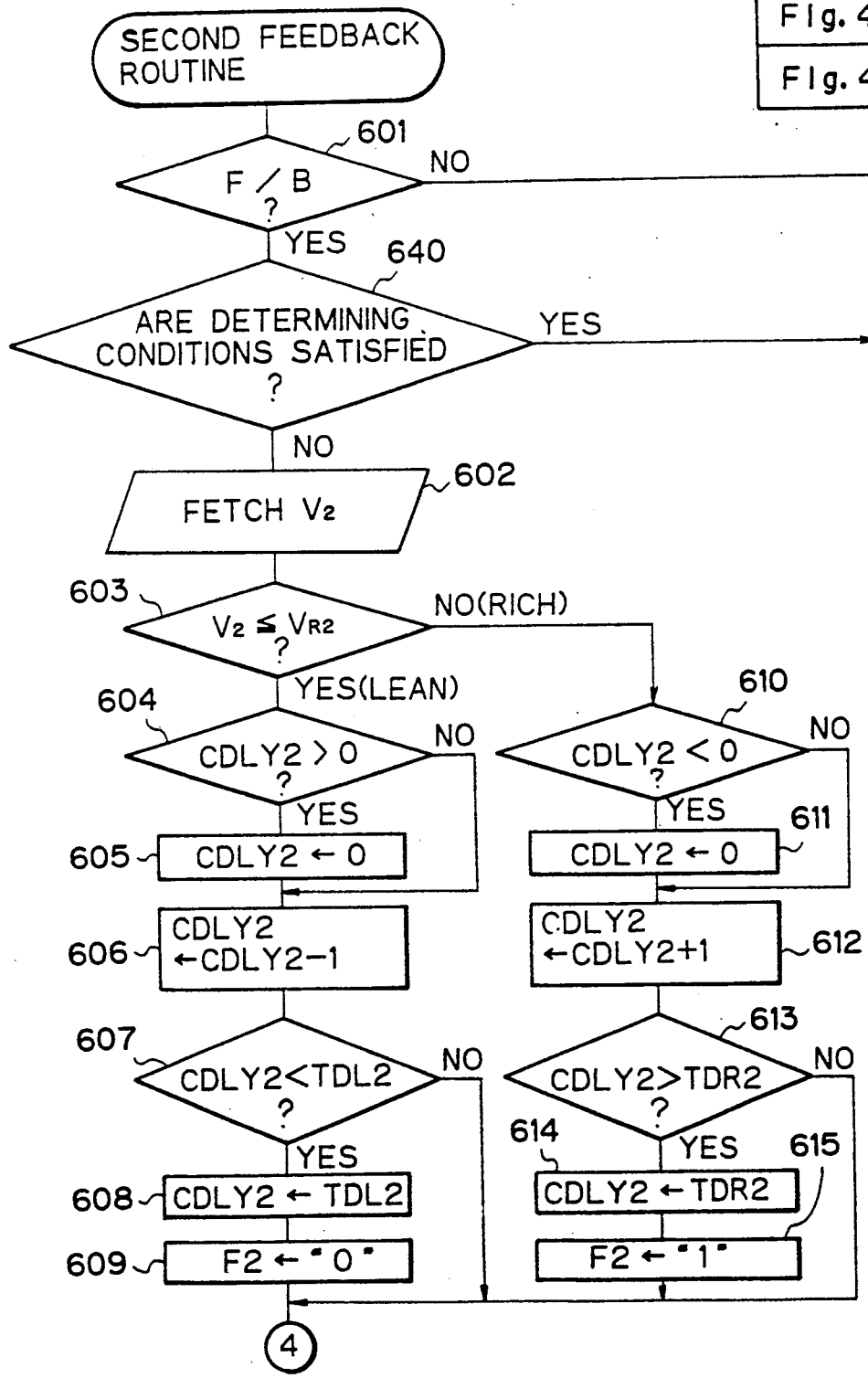
FIG. 4 (4A and 4B) is a flow chart for calculating the skip amount RSR and RSL.
Figure 4B:
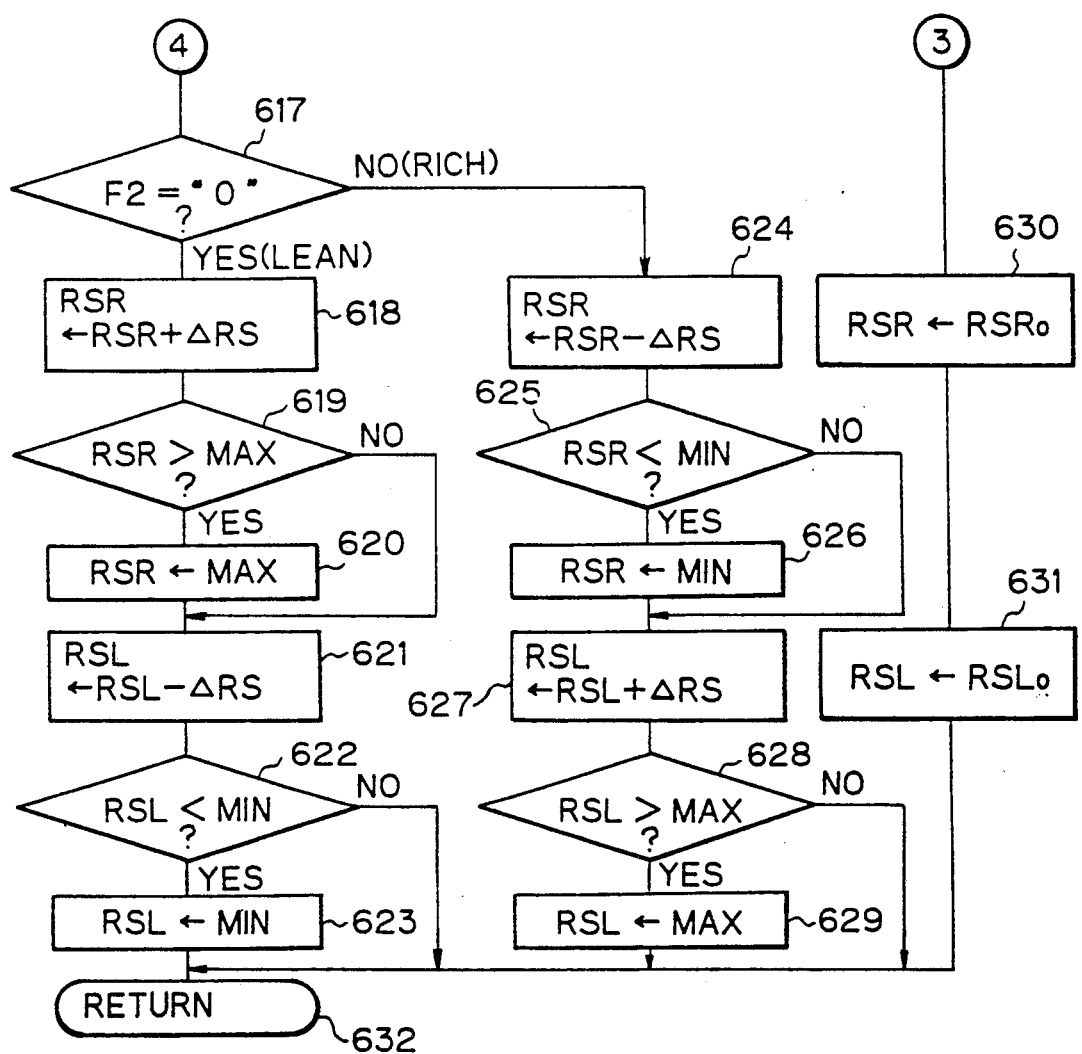

FIGS. 4A and 4B are a second feedback routine for calculating the skip amount RSR and RSL on the basis of the output of the downstream $O_2$ sensor 15 executed at a predetermined time such as 1 s.

At step 601, it is determined whether or not all of the feedback control (closed-loop control) conditions by the downstream $O_2$ sensor 15 are satisfied. For example, when the coolant temperature is lower than a predetermined temperature, when an engine running state is a transient running state, or when the feedback control conditions by the upstream $O_2$ sensor 13 are not satisfied, the feedback control conditions by the downstream $O_2$ sensor 15 are not satisfied.

If one or more of the feedback control conditions are not satisfied, the control proceeds to step 630, and at step 630, the rich skip amount RSR is made $RSR_0$. Note, $RSR_0$ is a constant value stored in the RAM 105 or a value stored in the backup RAM 106. Then, at step 631, the lean skip amount RSL is made $RSL_0$. Note, $RSL_0$ is a constant value stored in the RAM 105 or a value stored in the backup RAM 106.

Contrary to the above, at step 601, if all of the feedback control conditions are satisfied, the control proceeds to step 640. Step 640 is the same as step 430 in FIGS. 3A and 3B, and it is determined whether or not the determining conditions are satisfied.

When the determining conditions are satisfied, the control proceeds to step 630 and 631. Namely, when the determining conditions are satisfied, the skip amount RSR and RSL is not changed by the output of the downstream $O_2$ sensor 15 and remains constant.

When the determining conditions are not satisfied, the control proceeds to step 602.

At step 602, an A/D conversion is performed upon the output voltage $V_2$ of the downstream $O_2$ sensor 15 and the A/D converted value thereof is fetched from the A/D converter 101. At step 603, the voltage $V_2$ is compared with a reference voltage $V_{R2}$ such as 0.55V, thereby determining whether the current air-fuel ratio detected by the downstream $O_2$ sensor 15 is on the rich side or on the lean side with respect to the stoichiometric air-fuel ratio. Note that the reference voltage $V_{R2}$ ($=0.55$) is preferably higher than the reference voltage $V_{R1}$ ($=0.45V$), in consideration of the difference in output characteristics and rate of deterioration at the $O_2$ sensor 13 upstream of the catalyst converter 12 and at the $O_2$ sensor 15 downstream of the catalyst converter 12. Note, the voltage $V_{R2}$ can be voluntarily determined.

If $V_2 \leq V_{R2}$, i.e., the current air-fuel ratio is lean, the control proceeds to step 604 and it is determined whether or not the value of a second delay counter CDLY2 is positive. If CDLY2 > 0, the control proceeds to step 605 and the second delay counter CDLY2 is cleared, and then proceeds to step 606. If CDLY2 $\leq$ 0, the control proceeds directly to step 606. At step 606, the second delay counter CDLY2 is decremented by 1, and at step 607, it is determined whether or not CDLY2 < TDL2. Note that TDL2 is a second lean delay time for which a rich state is maintained even after the output of the downstream $O_2$ sensor 15 is changed from the rich side to the lean side, and is defined by a negative value. Therefore, at step 607, only when CDLY2 < TDL2 does the control proceed to step 608, at which CDLY2 is made TDL2, and then to step 609, at which a second air-fuel ratio flag F2 is made "0" (lean state).

Further, if $V_2 > V_{R2}$ at step 603, i.e., the current air-fuel ratio is rich, the control proceeds to step 610 and it is determined whether or not the value of the second delay counter CDLY2 is negative. If CDLY2 > 0, the control proceeds to step 611, and the second delay counter CDLY2 is cleared, and then proceeds to step 612. If CDLY2 $\geq$ 0, the control proceeds directly to step 612. At step 612, the second delay counter CDLY2 is incremented by 1, and at step 613 it is determined whether or not CDLY2 > TDR2. Note that TDR 2 is a rich delay time for which a lean state is maintained even after the output of the downstream $O_2$ sensor 15 is changed from the lean side to the rich side, and is defined by a positive value. Therefore, at step 613, only when CDLY2 > TDR2 does the control proceed to step 614, at which CDLY2 is made TDR2, and then to step 615, at which the second air-fuel ratio flag F2 is made "1" (rich state).

At step 617, if the flag F2 is "0" (lean), the control proceeds to step 618. At step 618, the rich skip amount RSR is increased by $\Delta RS$ (a constant value, for example, 0.08%), and accordingly the air-fuel ratio is moved to the rich side. At steps 619 and 620, the rich skip amount RSR is guarded by MAX (for example, 6.2%).

Then, at step 621, the lean skip amount RSL is decreased by $\Delta RS$, and accordingly, the air-fuel ratio is moved to the rich side. At steps 622 and 623, the lean skip amount RSL is guarded by MIN (for example, 2.5%).

Further, at step 617, if the flag F2 is "1" (rich), the control proceeds to step 624. At step 624, the rich skip amount RSR is decreased by $\Delta RS$, and accordingly, the air-fuel ratio is moved to the rich side. At steps 625 and 626, the rich skip amount RSR is guarded by MIN.

Then, at step 627, the lean skip amount RSL is increased by $\Delta RS$, and accordingly, the air-fuel ratio is moved to the lean side. At steps 628 and 629, the lean skip amount RSL is guarded by MAX.

The skip amounts RSR and RSL are then stored in the RAM 105, to thus complete this routine of FIGS. 4A and 4B at step 632.

Note, the calculated FAF, RSR, and RSL can be stored in the backup RAM 106 as FAF', RSR', and RSL', and thus the engine running state can be improved when restarting the engine.

Note that the minimum value MIN is a level at which the transient characteristics of the skip operation using the amounts RSR and RSL can be maintained, and the maximum value MAX is a level at which the drivability is not deteriorated by fluctuations of the air-fuel ratio.

As mentioned above, in the routine of FIGS. 4A and 4B, when the output of the downstream $O_2$ sensor 15 is lean, the rich skip amount RSR is gradually increased and the lean skip amount RSL is gradually decreased, and thus the air-fuel ratio is moved to the rich side.

Further, when the output of the downstream $O_2$ sensor 15 is rich, the rich skip amount RSR is gradually decreased and the lean skip amount RSL is gradually increased, and thus the air-fuel ratio is moved to the lean side.

A conventional determination of a deterioration of the condition of a catalyst will be described.

Referring to FIG. 5, the voltage output by the upstream $O_2$ sensor 13 vibrates about the reference voltage $V_{R1}$ and the air-fuel ratio feedback correction amount FAF changes in accordance with the voltage output by the upstream $O_2$ sensor 13. The change of the $O_2$ storage amount of the catalyst converter 12 delays relative to the change of the voltage output by the upstream $O_2$ sensor 13.

When the air-fuel ratio detected by the upstream $O_2$ sensor 13 becomes rich at $t_1$, the $O_2$ storage amount does not begin to decrease until $t_2$. Then at $t_3$, when the $O_2$ storage amount becomes 0, the voltage output by the downstream $O_2$ sensor 15 begins to increase. Then, when the air-fuel ratio detected by the upstream $O_2$ sensor 13 becomes lean at $t_5$, the voltage output by the downstream $O_2$ sensor 15 becomes 0 at $t_4$, and then the $O_2$ storage amount begins to increase at $t_4$ and reaches the full $O_2$ storage amount at $t_6$. The full $O_2$ storage amount decreases in accordance with the deterioration of the condition of the catalyst.

When the condition of the catalyst has not deteriorated, since the full $O_2$ storage amount is large enough, the time ($t_3$–$t_4$) for which the $O_2$ storage amount is 0 becomes short. Accordingly, the voltage output by the downstream $O_2$ sensor 15 is rarely higher than the reference voltage $V_{R2}$, and therefore, when the condition of the catalyst has not deteriorated, the frequency of the voltage output by the downstream $O_2$ sensor 15, i.e., the number of reversions of the voltage output by the downstream $O_2$ sensor 15 per unit time, is considerably lower than the frequency of the voltage output by the upstream $O_2$ sensor 13.

When the condition of the catalyst has slightly deteriorated and the purification rate of HC becomes, for example, 80%, since the full $O_2$ storage amount is considerably decreased, the time ($t_3$–$t_4$) for which the $O_2$ storage amount is 0 is increased (see FIG. 6), and accordingly, the voltage output by the downstream $O_2$ sensor 15 is rarely higher than the increase of the reference voltage $V_{R2}$. Therefore, when the condition of the catalyst has deteriorated, the frequency of the voltage output by the downstream $O_2$ sensor 15 is increased. Therefore, the deterioration of the catalyst can be detected by the ratio of the frequency of the voltage output by the upstream $O_2$ sensor 13 to the frequency of the voltage output by the downstream $O_2$ sensor 15.

When the condition of the catalyst has considerably deteriorated, and the purification rate of HC becomes, for example, 40–50% (see FIG. 7) the full $O_2$ storage amount is further decreased. Nevertheless, the time between $t_3$ and $t_4$ in FIG. 7 for which the $O_2$ storage amount is 0 is substantially the same as the time between $t_3$ and $t_4$ in FIG. 6. This is because, since the rate of change of the air-fuel ratio feedback correction amount FAF, i.e., the skip amount RSR and RSL and the integration amount KIR and KIL, is too large, the rate of change of the air-fuel ratio becomes too large, and thus the rate of change of the $O_2$ storage amount becomes too large.

Accordingly, since the frequency of the voltage output by the downstream $O_2$ sensor 15 when the condition of the catalyst has considerably deteriorated (see FIG. 7) is substantially the same as the frequency of the voltage output by the downstream $O_2$ sensor 15 when the condition of the catalyst has slightly deteriorated (see FIG. 6), a problem arises in that the considerable deterioration (FIG. 7) of the condition of the catalyst cannot be distinguished from the slight deterioration (FIG. 6) of the condition of the catalyst.

Therefore, in this embodiment, when a deterioration of the condition of the catalyst is determined, the rate of change of the air-fuel ratio feedback correction amount FAF, i.e., the skip amount RSR and RSL and the integration amount KIR and KIL, is decreased As a result, since the rate of change of the air-fuel ratio is decreased, the rate of charge of the $O_2$ storage amount is also decreased. Namely, in the routine shown in FIG. 3, when the conditions for determining a deterioration of the condition of the catalyst are satisfied, the skip amount and the integration amount are decreased by making $k_1$ 0.2 at step 431 and making $k_2$ 0.3 at step 432.

Therefore, as shown in FIG. 8, since the rate of change of the air-fuel ratio feedback correction amount FAF becomes small, the rate of change of the voltage output by the upstream $O_2$ sensor 13 also becomes small. Accordingly, since the rate of change of the $O_2$ storage amount becomes small, the time for which the $O_2$ storage amount is 0 becomes short, and thus the voltage output by the downstream $O_2$ sensor 15 is rarely higher than the reference voltage $V_{R2}$. Accordingly, when a slight deterioration of the condition of the catalyst is determined, the frequency of the voltage output by the downstream $O_2$ sensor 15 is considerably lower than the frequency of the voltage output by the upstream $O_2$ sensor 13.

Further, when a considerable deterioration of the condition of the catalyst, is determined as shown in FIG. 9, since the full $O_2$ storage amount becomes lower, the time $(t_3-t_4)$ for which the $O_2$ storage amount is 0 is increase, and thus the voltage output by the downstream $O_2$ sensor 15 is rarely higher than an increase in the reference voltage $V_{R2}$. As a result, it can be determined that the condition of the catalyst has considerably deteriorated when the ratio of the frequency of the voltage output by the downstream $O_2$ sensor 15 to the frequency of the voltage output by the upstream $O_2$ sensor 13 is larger than a predetermined value.

Figure 10B:
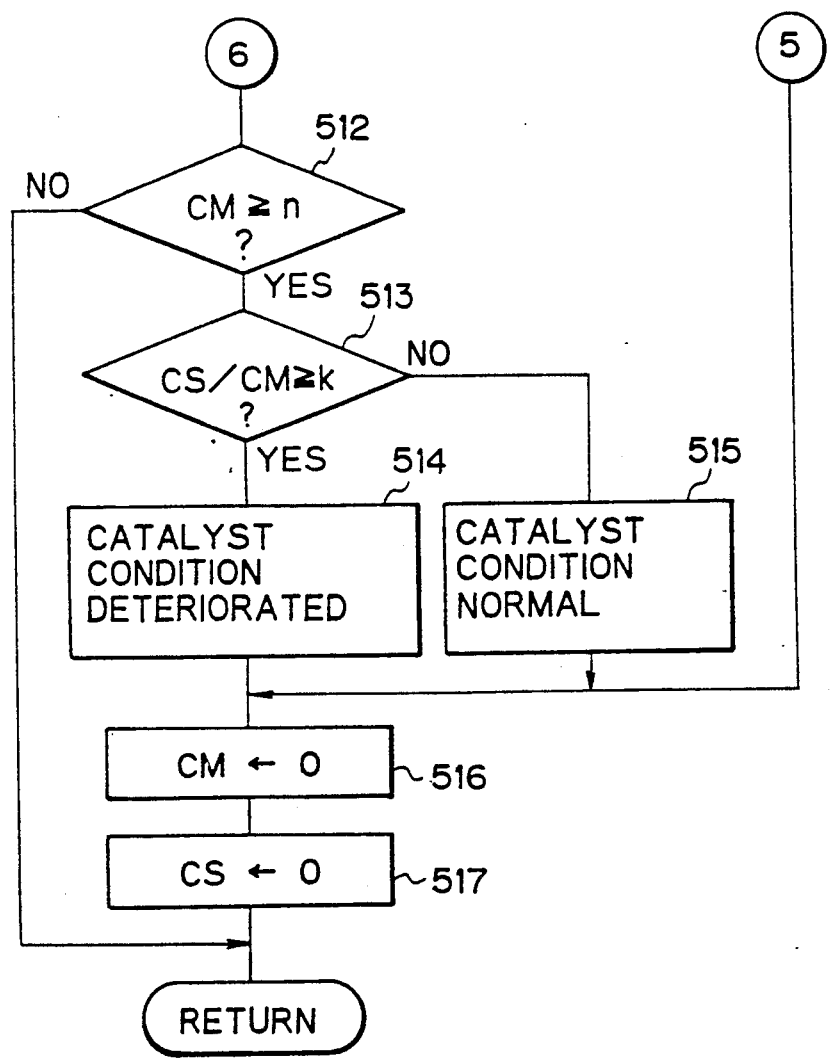
FIG. 10 (10A and 10B) is a flow chart for determining a deterioration of the condition of a catalyst.

FIGS. 10A and 10B are a routine for determining a deterioration of the condition of the catalyst. This routine is executed at a predetermined time such as 4 ns.

Referring to FIGS. 10A and 10B, at step 501, it is determined whether or not the determining conditions are satisfied. These determining conditions are the same as the determining conditions found at step 430 in FIG. 3A.

When the determining conditions are not satisfied, the control proceeds to steps 516 and 517 and a first counter CM and a second counter CS are cleared. When the determining conditions are satisfied, the control proceeds to step 502 and it is determined whether or not the output voltage $V_1$ of the upstream $O_2$ sensor 13 is smaller than or equal to the reference voltage $V_{R1}$, such as 0.45V, to thereby determine whether the current air-fuel ratio detected by the upstream $O_2$ sensor 13 is on the rich side or the lean side with respect to the stoichiometric air-fuel ratio.

If $V_1<V_{R1}$, the control proceeds to step 503 and it is determined whether or not an output voltage $V_{1B}$ of the upstream $O_2$ sensor 13 in the previous processing cycle is smaller than or equal to the reference voltage $V_{R1}$. If $V_{1B}>V_{R1}$, the control proceeds to step 504 and the first counter CM is incremented by 1. If $V_{1B}>V_{R1}$, step 504 is skipped.

Conversely, if $V_1>V_{R1}$ at step 502, the control proceeds to step 505 and it is determined whether or not $V_{1B}$ is smaller than or equal to $V_{R1}$. If $V_{1B}\leq V_{R1}$, the control proceeds to step 504 and the first counter CM is incremented by 1. If $V_{1B}>V_{R1}$, step 504 is skipped.

Namely, the first counter CM is incremented by 1 only when the air-fuel ratio detected by the upstream $O_2$ sensor 13 is reversed from the rich side to the lean side or from the lean side to the rich side. Accordingly, the first counter CM represents the number of the reversals of the output voltage of the upstream $O_2$ sensor 13, i.e., the frequency of the voltage output by the upstream $O_2$ sensor 13.

At step 506, the output voltage $V_1$ of the upstream $O_2$ sensor 13 is stored in $V_{1B}$. At step 507, it is determined whether or not the output voltage $V_2$ of the downstream $O_2$ sensor 15 is smaller than or equal to the reference voltage $V_{R2}$, to thereby determine whether the current air-fuel ratio detected by the downstream $O_2$ sensor 15 is on the rich side or on the lean side with respect to the stoichiometric air-fuel ratio.

If $V_2<V_{R2}$, the control proceeds to step 508 and it is determined whether or not an output voltage $V_{2B}$ of the downstream $O_2$ sensor 15 in the previous processing cycle is smaller than or equal to the reference voltage $V_{R2}$. If $V_{2B}>V_{R2}$, the control proceeds to step 509 and the second counter CS is incremented by 1. If $V_{2B}\leq V_{R2}$, step 509 is skipped.

Conversely, if $V_2>V_{R2}$ at step 507, the control proceeds to step 510 and it is determined whether or not $V_{2B}$ is smaller than or equal to $V_{R2}$. If $V_{2B}\leq V_{R2}$, the control proceeds to step 509 and the second counter CS is incremented by 1. If $V_{2B}>V_{R2}$, step 509 is skipped.

Namely, the second counter CS is incremented by 1 only when the air-fuel ratio detected by the downstream $O_2$ sensor 15 is reversed from the rich side to the lean side or from the lean side to the rich side. Accordingly, the second counter CS represents the number of the reversals of the output voltage of the downstream $O_2$ sensor 15, i.e., the frequency of the voltage output by the downstream $O_2$ sensor 15.

At step 511, the output voltage $V_2$ of the downstream $O_2$ sensor 15 is stored in $V_{2B}$, and at step 512, it is determined whether or not the first counter CM is equal to or larger than 12, e.g., 50. If CM<n, the routine is completed. If CM$\geq$n, the control proceeds to step 513-517 and it is determined whether or not the condition of the catalyst has considerably deteriorated. At step 513, it is determined whether or not CS/CM is equal to or larger than a predetermined value k. When the condition of the catalyst has not considerably deteriorated, since the frequency of the voltage output by the downstream $O_2$ sensor 15 is low, the count at the second counter CS is much smaller than the count at the first counter CM. Therefore, since CS/CM is smaller than k, the control proceeds to step 515 and it is determined that the catalyst is in a normal condition.

Further, when the condition of the catalyst has considerably deteriorated, since the frequency of the voltage output by the downstream $O_2$ sensor 15 becomes high, CS/CM is equal to or larger than k, and accordingly, the control proceeds to step 514. At step 514, it is determined that the condition of the catalyst has considerably deteriorated and an alarm lamp 16 is lit. Then, at step 516, the first counter CM is cleared and the second counter CS is cleared.

As mentioned above, according to this embodiment, it can be determined whether or not the condition of the catalyst has considerably deteriorated, i.e., the purification rate of HC is smaller than 40-50%, by decreasing the skip amount and the integration amount. Note, although in this embodiment it is determined by the frequency of the voltage output by the $O_2$ sensors that the condition of the catalyst has considerably deteriorated, this can be determined by the cycle of the voltage output by the $O_2$ sensors.

Namely, the difference in the voltage output by the downstream $O_2$ sensor when the condition of the catalyst has considerably deteriorated and when it has not deteriorated is clearly obtained, i.e., any method can be used to determine the condition of the catalyst as long as it utilizes the voltage output by the downstream $O_2$ sensor.

Further, the reference voltage $V_{R2}$ at step 603 in FIGS. 4A and 4B can be different from the reference voltage $V_{R2}$ at steps 507, 508, and 510 in FIG. 10.

Furthermore, the reference voltage $V_{R2}$ in FIGS. 10A and 10B can be variable, and thus the degree of deterioration of the condition of the catalyst can be determined by changing the reference voltage $V_{R2}$.

Also, in this embodiment, the skip coefficient k1 and the integration coefficient k2 have two different values respectively, but can have more than two different values, whereby the degree of deterioration of the condition of the catalyst can be determined.

Further, it can be determined that the condition of the catalyst has deteriorated when the number of reversions of the output of the downstream $O_2$ sensor per unit time is larger than a predetermined fixed constant number.

Furthermore, either the skip amount or the integration amount can be decreased when the determining conditions are satisfied.

Although the invention has been described with reference to specific embodiments chosen for purposes of illustration, it should be apparent that numerous modifications can be made thereto without departing from the basic concept and scope of the invention.

We claim:

1. An apparatus for determining a deterioration of a condition of a three-way catalyst arranged in an exhaust passage of an internal combustion engine, said apparatus comprising:

an upstream air-fuel ratio detecting means arranged in the exhaust passage upstream of the three-way catalyst for detecting an air-fuel ratio;

a downstream air-fuel ratio detecting means arranged in the exhaust passage downstream of the three-way catalyst for detecting the air-fuel ratio;

an air-fuel ratio feedback correction amount calculating means for calculating an air-fuel ratio feedback correction amount in accordance with an output of said upstream air-fuel ratio detecting means;

an air-fuel ratio control means for controlling the air-fuel ratio to a predetermined target air-fuel ratio on the basis of said air-fuel ratio feedback correction amount;

an engine running state determining means for determining whether or not an engine running state is a predetermined engine running state in which it can be determined whether the condition of the three-way catalyst has deteriorated;

a reducing means for reducing a rate of change of said air-fuel ratio feedback correction amount when said engine running state determining means determines that the engine running state is said predetermined engine running state; and a deterioration determining means for determining that the condition of the three-way catalyst has deteriorated by utilizing an output of said downstream air-fuel ratio detecting means when said engine running state determining means determines that the engine running state is said predetermined engine running state.

2. An apparatus according to claim 1, wherein said deterioration determining means determines that the condition of the three-way catalyst has deteriorated when the number of reversions of the output of said downstream air-fuel ratio detecting means per unit time is larger than a predetermined number when said engine running state determining means determines that the engine running state is said predetermined engine running state.

3. An apparatus according to claim 2, wherein said predetermined number is defined by a fixed constant value.

4. An apparatus according to claim 2, wherein said predetermined number is defined by multiplying a number of reversions of an output of said upstream air-fuel ratio detecting means per unit time by a predetermined coefficient.

5. An apparatus according to claim 1, wherein said air-fuel ratio feedback correction amount calculating means skips down said air-fuel ratio feedback correction amount by a lean skip amount when an output of said upstream air-fuel ratio detecting means is switched from a lean side to a rich side, gradually decreases said air-fuel ratio feedback correction amount by a lean integration amount when the output of said upstream air-fuel ratio detecting means is on the rich side, skips up said air-fuel ratio feedback correction amount by a rich skip amount when the output of said upstream air-fuel ratio detecting means is switched from the rich side to the lean side, and gradually increases said air-fuel ratio feedback correction amount by a rich integration amount when the output of said upstream air-fuel ratio detecting means is on the lean side.

6. An apparatus according to claim 5, wherein said reducing means reduces said lean skip amount and said rich skip amount.

7. An apparatus according to claim 6, wherein said reducing means reduces said rich skip amount and said lean skip amount by multiplying said rich skip amount by a first coefficient and said lean skip amount by a second coefficient, said first and second coefficients being smaller than 1.

8. An apparatus according to claim 7, wherein said first coefficient is equal to said second coefficient.

9. An apparatus according to claim 7, wherein said first coefficient and said second coefficient are fixed constant values.

10. An apparatus according to claim 7, wherein said first coefficient and said ;second coefficient are variable values.

11. An apparatus according to claim 5, wherein said reducing means reduces said lean integration amount and said rich integration amount.

12. An apparatus according to claim 11, wherein said reducing means reduces said rich integration amount and said lean integration amount by multiplying said rich integration amount by a third coefficient and said lean integration amount by a fourth coefficient, said third and fourth coefficients being smaller than 1.

13. An apparatus according to claim 12, wherein said third coefficient is equal to said fourth coefficient.

14. An apparatus according to claim 12, wherein said third coefficient and said fourth coefficient are fixed constant values.

15. An apparatus according to claim 12, wherein said third coefficient and said fourth coefficient are variable values.

16. An apparatus according to claim 5, wherein said reducing means reduces said lean skip amount, said rich skip amount, said lean integration amount, and said rich integration amount.

17. An apparatus according to claim 16, wherein said reducing means reduces said rich skip amount, lean skip amount, rich integration amount, and lean integration amount by multiplying said rich skip amount by a first coefficient, said lean skip amount by a second coefficient, said rich integration amount by a third coefficient, and said lean integration amount by a fourth coefficient, said first through said fourth coefficients being smaller than 1.

18. An apparatus according to claim 17, wherein said first coefficient is equal to said second coefficient, and said third coefficient is equal to said fourth coefficient.

19. An apparatus according to claim 17, wherein said first coefficient through said fourth coefficient are fixed constant values.

20. An apparatus according to claim 17, wherein said first coefficient through said fourth coefficient are variable values.

21. An apparatus according to claim 5, wherein said air-fuel ratio feedback correction amount calculating means further comprises,
 a rich delay means for delaying an output of said upstream air-fuel ratio detecting means switched from the lean side to the rich side, and
 a lean delay means for delaying the output of said upstream air-fuel ratio detecting means switched from the rich side to the lean side.

22. An apparatus according to claim 21, wherein a rich delay time by said rich delay means is equal to a lean delay time by said lean delay means.

23. An apparatus according to claim 21, wherein a rich delay time by said rich delay means is increased relative to a lean delay time by said lean delay means when an output of said downstream air-fuel ratio detecting means is on the lean side, and said rich delay time is decreased relative to said lean delay time when the output of said downstream air-fuel ratio detecting means is on the rich side.

24. An apparatus according to claim 5, wherein said air-fuel ratio feedback correction amount calculating means further comprises a skip amount control means for increasing said rich skip amount relative to said lean skip amount when an output of said downstream air-fuel ratio detecting means is on the lean side and for decreasing said rich skip amount relative to said lean skip amount when the output of said downstream air-fuel ratio detecting means is on the rich side.

25. An apparatus according to claim 24, wherein said skip amount control means adds a first correction amount to said rich skip amount and subtracts a second correction amount from said lean skip amount when the output of said downstream air-fuel ratio detecting means is on the lean side, and subtracts a third correction amount from said rich skip amount and adds a fourth correction amount to said lean skip amount when the output of said downstream air-fuel ratio detecting means in on the rich side.

26. An apparatus according to claim 25, wherein said first correction amount, said second correction amount, said third correction amount, and said fourth correction amount are equal.

27. An apparatus according to claim 25, further comprising
 a rich delay means for delaying the output of said down stream air-fuel ratio detecting means switched from the lean side to the rich side, and
 a lean delay means for delaying the output of said downstream air-fuel ratio detecting means switched from the rich side to the lean side.

28. An apparatus according to claim 5, wherein said air-fuel ratio feedback correction amount calculating means further comprises an integration amount control means for increasing said rich integration amount relative to said lean integration amount when an output of said downstream air-fuel ratio detecting means is on the lean side and for decreasing said rich integration amount relative to said lean integration amount when the output of said downstream air-fuel ratio detecting means is on the rich side.

29. An apparatus according to claim 5, wherein it is determined that the output of said upstream air-fuel ratio detecting means is on the rich side when the output of said upstream air-fuel ratio detecting means is higher than a predetermined first reference value, and that the output of said upstream air-fuel ratio detecting means is on the lean side when the output of said upstream air-fuel ratio detecting means is lower than said first reference value.

30. An apparatus according to claim 29, wherein said first reference value is increased when an output of said downstream air-fuel ratio detecting means is on the lean side and is decreased when the output of said downstream air-fuel ratio detecting means is on the rich side.

31. An apparatus according to claim 29, wherein it is determined that an output of said downstream air-fuel ratio detecting means is on the rich side when the output of said downstream air-fuel ratio detecting means is higher than a predetermined second reference value and that the output of said downstream air-fuel ratio detecting means is on the lean side when the output of said downstream air-fuel ratio detecting means is lower than said second reference value.

32. An apparatus according to claim 31, wherein said first reference value is lower than said second reference value.

* * * * *